United States Patent [19]

Combest

[11] Patent Number: 5,174,841
[45] Date of Patent: Dec. 29, 1992

[54] METHOD OF MAKING AN IN-TANK FUEL FILTER

[75] Inventor: John F. Combest, Findlay, Ohio

[73] Assignee: Kuss Corporation, Findlay, Ohio

[21] Appl. No.: 759,829

[22] Filed: Sep. 13, 1991

Related U.S. Application Data

[60] Continuation of Ser. No. 591,808, Oct. 2, 1990, abandoned, which is a division of Ser. No. 349,524, May 9, 1989, Pat. No. 4,961,850.

[51] Int. Cl.⁵ .............................................. B32B 31/16
[52] U.S. Cl. ............................... 156/73.1; 156/275.1; 210/232
[58] Field of Search ................... 156/73.1, 73.2, 275.1; 210/172, 232, 445, 461, 462, 496, 499

[56] References Cited

U.S. PATENT DOCUMENTS

| | | | |
|---|---|---|---|
| 3,782,083 | 1/1974 | Rosenberg | 210/445 |
| 3,806,386 | 4/1974 | Burke et al. | 156/73.1 |
| 3,826,372 | 7/1974 | Bell | 210/172 |
| 4,234,428 | 11/1980 | Schnell | 210/346 |
| 4,250,039 | 2/1981 | Cozzi et al. | 210/462 |
| 4,259,419 | 3/1981 | Uba et al. | 156/73.1 |
| 4,312,753 | 1/1982 | Bell | 210/250 |
| 4,650,529 | 3/1987 | Guest | 156/73.1 |
| 4,743,370 | 5/1988 | Mizusawa | 210/460 |
| 4,783,260 | 11/1988 | Kurihara | 210/416.4 |
| 4,853,123 | 8/1989 | Hayes et al. | 210/461 |

FOREIGN PATENT DOCUMENTS 2286512 12/1987 Japan ......................... 156/73.1

*Primary Examiner*—Robert A. Dawson
*Assistant Examiner*—Matthew O. Savage
*Attorney, Agent, or Firm*—Willian Brinks Olds Hofer Gilson & Lione

[57] ABSTRACT

A fuel filter and method of making same provides an in-tank filter having a novel fitting and seal construction. The filter includes a fabric body and a spacing structure disposed within the body to prevent collapse of the filter and accompanying reduction of or interference with fuel flow. The fitting comprises a first segment disposed outside the filter and incorporating a fuel line receiving aperture and a second, mating segment disposed within the filter. The filter segments are ultrasonically bonded to the fabric such that melting material from the segments flows into the interstices of the fabric and mechanically bonds and retains it within the segments of the fitting.

13 Claims, 2 Drawing Sheets

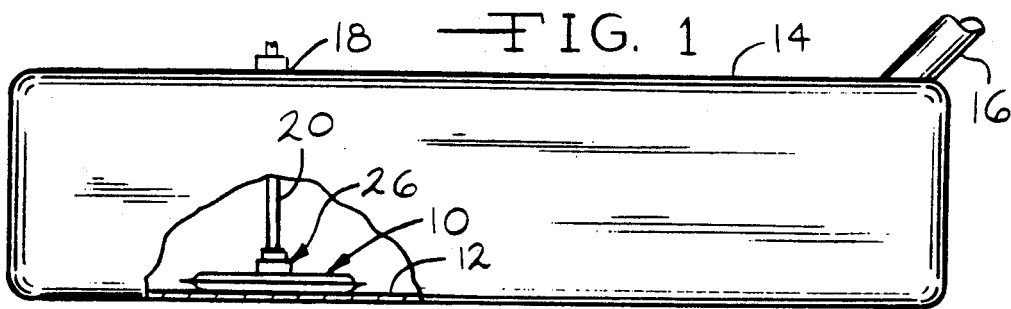
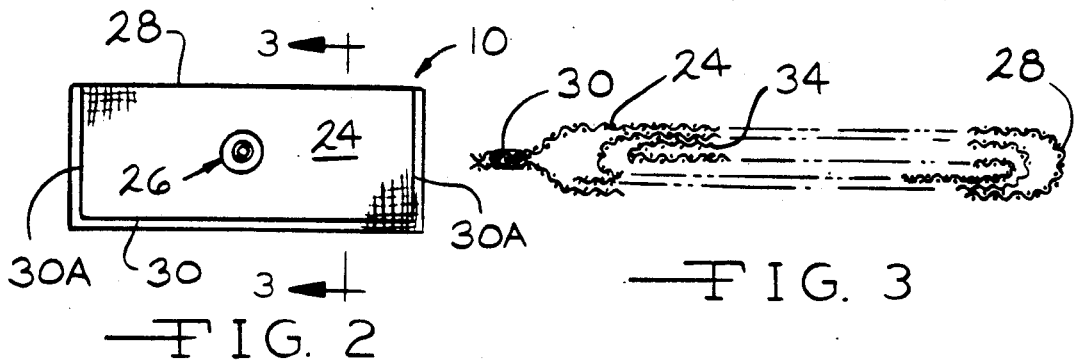
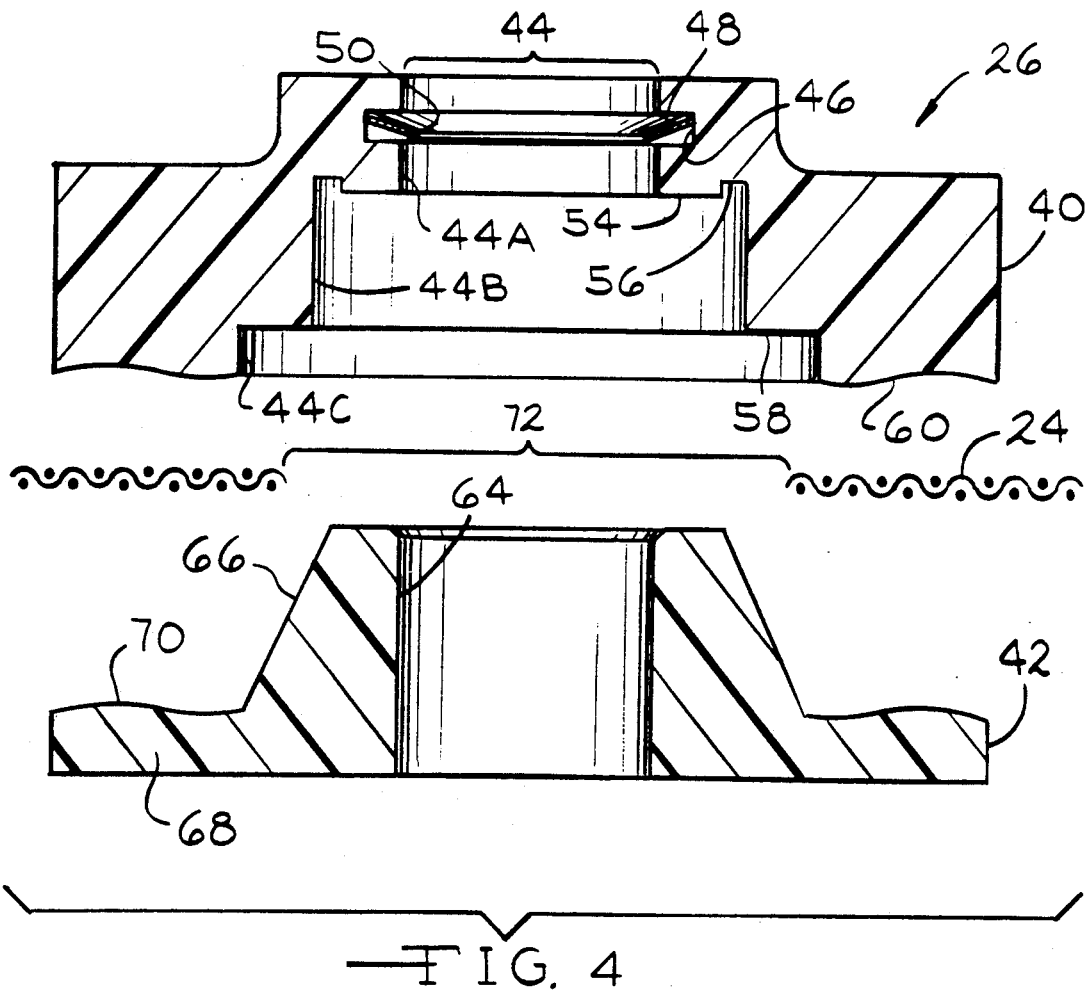

METHOD OF MAKING AN IN-TANK FUEL FILTER

This patent application is a continuation of Ser. No. 07/591,808, filed Oct. 2, 1990, now abandoned, which was a division of application Ser. No. 07/349,524, filed May 9, 1989, now U.S. Pat. No. 4,961,850.

BACKGROUND OF THE INVENTION

The invention relates to fuel filters and more specifically to an in-tank fuel filter and method of making same wherein the fuel line fitting comprises a pair of mating segments which are bonded to the fabric and to each other.

In conventional vehicular fuel systems, a fuel filter is provided at the terminus of the fuel line within the fuel tank. The in-tank filter functions as a large area filter possessing several significant benefits. First of all, because the filter is generally enveloped by the fuel, its large surface area provides minimal flow resistance. Secondly, because the fuel flow is intermittent, that is, related to the operation or quiescence of the vehicle engine, particulates attracted to and trapped on the surface of the filter during periods of fuel flow will generally dislodge during quiescent periods. Such action effectively renews the filtration surface and extends the life of the filtration element to the extent that it generally never requires replacement. Thirdly, certain materials such as fabric manufactured from Saran brand threads (Saran is a registered trademark of the Dow Chemical Company.) exhibit the capability, when wetted with gasoline, of separating water from gasoline and thus inhibit the flow of water into the fuel system of the vehicle.

Numerous in-tank fuel filter designs have been proposed. For example, in U.S. Pat. No. 3,826,372, granted July 30, 1974, a tubular flexible filter is disclosed. The filter is secured to a fuel line fitting and is maintained in forced contact with the tank bottom to assure a flow of fuel at the lowest possible fuel level in the tank.

Another in-tank fuel filter is disclosed in U.S. Pat. No. 4,312,753. This device utilizes a flexible woven plastic cloth having spacers secured to at least one of the walls of the filter to inhibit collapse of the filter and ensure fuel flow therethrough. The filter includes a fuel line fitting which is injection molded onto the filter fabric.

A common difficulty of these and other fuel filter designs relates to the incompatibility of materials utilized to fabricate the filter. For example, as noted above, the filter fabric may be of Saran material. A common and desirable material for the fittings of the filter such as the fuel line coupling and spacers is nylon. If, as discussed above, the fittings are injection molded onto the fabric, no melting and molecular bonding of the materials typically occurs. Accordingly, achieving a strong mechanical bond may be difficult, in the first place. In the second place, it may be difficult to achieve an impervious seal between the fabric and the fitting which precludes flow of any unfiltered fuel into the fuel system.

A second area of difficulty relates to the injection molding process. In such a process, a swatch of fabric having a previously prepared, suitably sized opening is positioned within a mold. The mold is closed and the fitting, spacer or other component of the filter is then injection molded according to conventional techniques. While the process itself is viable and the products fabricated thereby are wholly serviceable, utilization of injection molding for the production of items such as fuel filters is not without difficulties. The first problem relates to handling the fabric. Because of the difficulties of handling fabric swatches, such as, engagement, movement and orientation, for example, handling of the individual fabric swatches by automated equipment poses many challenges. Accordingly, manual handling of the fabric presently provides the highest production yield. A second, associated problem relates to placement of the fabric within the mold. The fabric must be accurately positioned within the mold cavity in order to ensure fabrication of an acceptable component. As those familiar with injection molding processes will readily appreciate, the inaccurate placement of components within a mold cavity which then prevents the mold from properly closing and sealing during the injection molding process results in a wholly unacceptable condition which produces a defective product and may result in material loss. Though slower than automated equipment, manual placement of the fabric in the mold cavity is presently preferable.

A third area of difficulty devolves from the injection molding process and another aspect of fabric position. As the molten material is injected into the mold cavity and against the fabric, it tends to displace the fabric against a cavity wall. Consequently, the spacer or other molded fitting will not be medially positioned on the fabric but may reside substantially or entirely on one side of the fabric which is undesirable. It is known to include slender, aligned, positioning pins in the mold which retain the fabric in the desired position during molding. Such pins increase the complexity of the mold, add to its expense and are easily damaged. Furthermore, the openings they leave in the molded component may permit unfiltered fuel flow into the interior of the fuel filter.

Accordingly, products and processes which represent improvements over the injection molding process routinely utilized for the production of items such as fuel filters are not only desirable but possible.

SUMMARY OF THE INVENTION

The invention relates to an in-tank fuel filter and method of making same. The fuel filter includes a novel fuel line fitting and seal construction. The filter has a fabric body composed of woven threads of nylon, Saran or similar material. Preferably, the fabric body is formed from a folded swatch of fabric. A spacing structure of rolled fabric, for example, disposed within the fabric body, prevents collapse of the filter and accompanying reduction of or interference with fuel flow. The fitting comprises a first segment disposed outside the filter which incorporates a fuel line retaining member and a second, mating segment disposed within the filter which incorporates a fuel line receiving aperture. The fitting segments are ultrasonically bonded to one another. Melting material from the segments creates a bead which flows into the interstices of the fabric and mechanically bonds and retains it within the segments of the fitting. The segments also include complementarily convoluted radially extending shoulders which grip the fabric and assist its retention in the assembled fitting.

It is thus an object of the present invention to provide an in-tank fuel filter having a two-component fuel line fitting wherein the components are ultrasonically bonded together.

It is a further object of the present invention to provide an in-tank fuel filter having a two-component fuel line fitting wherein the filter fabric is bonded and mechanically retained within the fuel line fitting.

It is a still further object of the present invention to provide a method of fabricating an in-tank fuel filter wherein components of the fuel line fitting are ultrasonically bonded together.

It is a still further object of the present invention to provide a method of fabricating an in-tank fuel filter wherein the filter fabric is bonded and mechanically retained within the components of the fuel line fitting.

Still further objects and advantages of the present invention will become apparent by reference to the following description of the preferred embodiment and appended drawings.

BRIEF DESCRIPTION OF THE DRAWINGS

FIG. 1 is a diagrammatic, side elevational view, with portions broken away, of a fuel tank including an in-tank fuel filter according to the present invention;

FIG. 2 is a top plan view of an in-tank fuel filter according to the present invention;

FIG. 3 is an enlarged, full sectional view of an in-tank fuel filter according to the present invention taken along line 3—3 of FIG. 2;

FIG. 4 is a greatly enlarged, full sectional view of the fuel line fitting of an in-tank filter according to the present invention in a pre-assembly configuration;

DESCRIPTION OF THE PREFERRED EMBODIMENT

Figure 5:
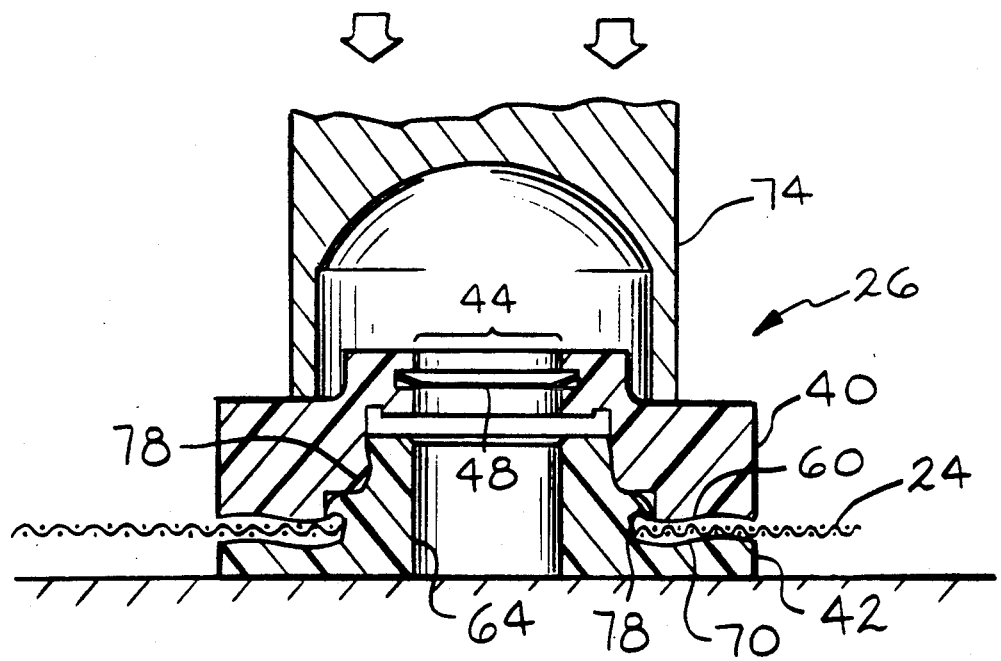
FIG. 5 is an enlarged, full sectional view of the components of a fuel line fitting of an in-tank fuel filter according to the present invention during assembly by the application of an ultrasonic energy.

Referring now to FIG. 1, an in-tank fuel filter assembly according to the present invention is illustrated and generally designated by the reference numeral 10. The in-tank fuel filter assembly 10 is illustrated disposed adjacent the bottom wall 12 of a vehicle fuel tank 14. The vehicle fuel tank 14 is conventional and representative of the general class of vehicle fuel storage enclosures with which the present invention will be utilized. As such, it includes an inlet tube 16 for facilitating supply of fuel to the fuel tank 14 and an outlet fitting 18 through which a fuel line 20 sealingly extends and fuel may be withdrawn.

Referring now to FIGS. 1, 2 and 3, the fuel filter assembly 10 comprises a fabric swatch 24 and a fuel line fitting 26. The material of the fabric swatch 24 may be nylon, Saran polyester, polyvinyl chloride or copolymers of polyvinyl dichloride. Saran is a registered trademark of the Dow Chemical Company. While the fabric swatch 24 will typically be homogeneous, that is, comprehend a fabric of monofilament warp and woof threads of the same material, it is also within the scope of this invention to utilize a fabric comprehending warp threads of one material (e.g., nylon) and woof threads of another material (e.g., Saran), to utilize multifilament threads as well as monofilament threads and any combination of the above variables.

The fiber or thread size and size of the interstices between fibers of the fabric swatch 24 may vary widely over appropriate ranges to provide filtration of selected sizes of undesirable particulates. Typically, interstitial opening sizes of 60 to 100 microns provides suitable particulate filtration of hydrocarbon fuels intended for use in internal combustion engines. Fiber or thread size is typically in the range of 0.004 to 0.008 inches and is preferably from about 0.0055 inches to 0.007 inches depending on the material and desired characteristics of the fuel filter assembly 10. The fabric swatch 24 may be folded upon itself along a fold line 28 and sealed by ultrasonic bonding, chemical solvents or other means along a longitudinal seal 30 and along transverse seals 30A extending across the ends of the fabric swatch 24.

Disposed within the fabric swatch 24 of the fuel filter assembly 10 is a porous insert 34. The porous insert 34 maintains the upper and lower walls of the fabric swatch 24 of the fuel filter assembly 10 in spaced configuration to facilitate fuel flow between and into the fuel line fitting 26 while providing minimal flow resistance. The porous insert 34 may be any suitable size wrapped or rolled swatch of nylon, Saran or other fabric or may be extruded polypropylene netting having, for example, a generally cylindrical cross-section in pre-assembly configuration.

Referring now to FIG. 4, the fuel line fitting 26 includes an upper fuel line segment or fitting 40 and a mating lower fuel line segment or fitting 42. The upper fuel line fitting 40 is preferably circular and defines a concentrically disposed circular through aperture 44. A first portion 44A of the through aperture 44 defines the smallest diameter region. Generally medially axially disposed within the first portion 44A of the through aperture 44 is a reentrant circumferential channel 46. The circumferential channel 46 receives and retains a flexible metallic retaining ring 48. The retaining ring 48 defines a concentric circular aperture 50 which receives the fuel line 20 and tightly frictionally retains the fuel line 20 within the upper fuel line fitting 40 as illustrated in FIGS. 1 and 6.

The upper fuel line fitting 40 also includes a first, radially extending shoulder 54 and adjacent reentrant axially extending recess or channel 56. The through aperture 44 further includes a second, larger diameter region 44B which extends axially from the channel 56 to a second, radially extending shoulder 58. Finally, the through aperture 44 includes a third, largest diameter region 44C. The lower face of the upper fuel line fitting 26 defines a circumferential, convoluted surface 60.

Figure 6:
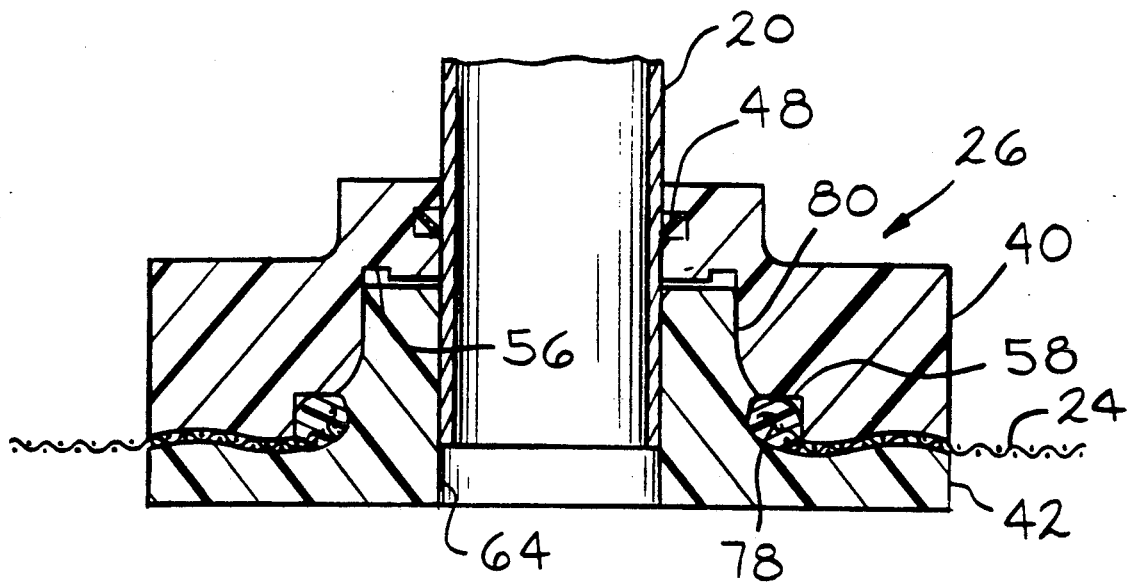
FIG. 6 is an enlarged, full sectional view of the completed fuel line fitting of an in-tank fuel filter according to the present invention.

The lower fuel line fitting 42 is also preferably circular and defines a centrally disposed through aperture 64 which also receives the fuel line 20 as illustrated in FIG. 6. The through aperture 64 is preferably the same diameter as the first portion 44A of the through aperture 44. The lower fuel line fitting 42 defines a frusto-conical face 66. The frusto-conical face 66 has an upper, smaller diameter adjacent the upper face of the lower fitting 42 which is preferably slightly less than the diameter of the second, larger diameter region 44B of the through aperture 44 and has a lower, larger diameter approximately equal to the third, largest diameter region 44C of the through aperture 44. The lower fuel line fitting 42 includes a radially extending flange 68 having a convoluted surface 70 which aligns with the complementarily convoluted surface 60 of the upper fuel line fitting 40. As illustrated in FIG. 4, in pre-assembly configuration, the upper and lower fuel line fittings 40 and 42, respectively, are generally disposed and aligned on opposite sides of the fabric swatch 24 in which a circular aperture 72 has been formed.

Referring now to FIG. 5, the fuel line fitting 26 is shown during the ultrasonic bonding assembly step. As such, the upper fuel line fitting 40 is bonded to the lower fuel line fitting 42 by the application of ultrasonic energy and compressive force. The ultrasonic energy is applied by a horn 74 which is the output and application component of an ultrasonic bonding machine (not illustrated). The horn 74 is circular and uniformly applies ultrasonic energy and mechanical force to the fuel line fitting 26 as those familiar with such bonding techniques will readily appreciate. As the assembly and bonding process occurs, the shoulder 58 shaves and deforms the material of the lower fuel line fitting 42 in the region of the frusto-conical surface 66. To a lesser extent, the frusto-conical surface 66 causes deformation and flow of the material of the upper fuel line fitting 40. The flow of such dislodged material forms a bead 78 which appears as the irregular shape in the cavity generally adjacent the shoulder 58. This bead 78 is a flow of dislodged material melted by the ultrasonic energy applied by the horn 74. As the upper and lower fittings 40 and 42, respectively, of the fuel line fitting 26 are compressed against one another, the molten material collects and flows toward the fabric swatch 24, forming the bead 78.

Referring now to FIG. 6, the final configuration of the fuel line fitting 26 is illustrated. Here, the upper fuel line fitting 40 is fully seated against the lower fuel line fitting 42. As such, the mating circular convoluted surfaces 60 and 70 are compressed against and retain the fabric swatch 24. More importantly, however, the bead 78 of dislodged material formed by the ultrasonic bonding process has generally filled the cavity adjacent the shoulder 58, filling the interstices in the fabric swatch 24. When the material 78 cools and hardens, the fabric swatch 24 is mechanically bonded and locked within the fuel line fitting 26 by virtue of such material flow. The upper fuel line fitting 40 and the lower fuel line fitting 42 are, of course, securely bonded together along the interface 80. Any molten material that flows upward along the interface 80 toward the first portion 44A of the through aperture 44 is received within the channel 56. The channel 56 acts as a trap to prevent the flow of melted material into the apertures 44 and 64 which receive the fuel line 20.

The preferred method of assembly of an in-tank fuel filter 10 according to the present invention comprehends the following steps. First of all, the upper and lower fuel line fitting 40 and 42 are molded by processes such as injection molding of a suitable plastic material such as nylon, acetal resin, or similar plastic or elastomer. The retaining ring 48 is then inserted in the circumferential groove 46 of the upper fuel line fitting 40. The fabric swatch 24 is cut to size and the aperture 72 formed therein through a process such as ultrasonic cutting. Next, the upper fuel line fitting 40 and lower fuel line fitting 42 are loaded into the ultrasonic bonding machine on opposite sides of the fabric swatch 24 and in alignment with each other and the aperture 72, as illustrated in FIG. 4. The ultrasonic horn 74 then engages the upper surface of the upper fuel line fitting 40 as illustrated in FIG. 5. Both axial force and ultrasonic energy are applied to the fuel line fitting 26, melting the material and forcing the fittings 40 and 42 together. During the bonding process, the formation of the bead 78 of material occurs and the fabric swatch 24 is compressed between the convoluted surfaces 60 and 70. As noted above, the bead 78 of dislodged material engages the marginal edge of the fabric swatch 24 at the aperture 72 and adjacent fabric, cools and tightly retains it within the fuel line fitting 26.

Upon completion of the ultrasonic bonding step, the longitudinal seam 30, illustrated in FIG. 3 may be accomplished by any suitable sealing technique such as radio frequency (RF) sealing, ultrasonic bonding, sewing or the use of chemical solvents or glues. Next, the porous insert 34 is stuffed into the interior of the fabric swatch 24, also as generally illustrated in FIG. 3. Finally, the remaining transverse seals 30A of the fuel filter assembly 10 are accomplished by one of the techniques listed directly above. The in-tank fuel filter assembly 10 according to the present invention is now complete.

The foregoing disclosure is the best mode devised by the inventor for practicing this invention. It is apparent, however, that devices and methods incorporating modifications and variations will be obvious to one skilled in the art of fuel filters. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method of fabricating a fuel filter comprising the steps of:

providing a first fuel line fitting defining a through passageway and having a frusto-conical projection defining a first end of a first diameter and a second end of a second diameter larger than said first diameter, a second fuel line fitting having a through, stepped passageway having a first region of a first diameter and a second region of second diameter smaller than said first diameter of said first region, said first diameter of said first end of said frusto-conical projection being slightly less than said second diameter of said second region of said second fitting and said second diameter of said second end of said frusto-conical projection region being larger than said second diameter of said second region of said second fitting, and a swatch of fabric defining an aperture, aligning said projection with said aperture and said stepped passageway, simultaneously applying ultrasonic energy and mechanical force to said fittings sufficient to drive said fittings together and dislodge material from said fittings, engaging said fabric with said dislodged material whereby said fabric is retained within said fittings by said dislodged material and sealing the unsealed edges of said fabric swatch.

2. The method of claim 1 further including the step of providing a region adjacent said first region for receiving said fabric and said dislodged material.

3. The method of claim 1 wherein said edge sealing is achieved by radio frequency of ultrasonic energy.

4. The method of claim 1 wherein said first and said second fuel line fittings are provided with complementary convoluted surfaces and further including the step of disposing said fabric between said surfaces during assembly of said first and said second fittings.

5. A method of fabricating a fuel filter comprising the steps of:

providing a first fuel line fitting defining a through aperture and having a projection defining a first end of a first diameter and a second end of a second diameter larger than said first diameter, a second fuel line fitting defining a second through, stepped aperture, said second through, stepped aperture defining a first region of a first diameter and a second region of a second diameter smaller than said first diameter of said first region, said first diameter of said first end of said projection being slightly less than said second diameter of said second region of said second fuel line fitting and said second diameter of said second end of said projection being greater than said second diameter of said second region of said second fuel line fitting, providing a swatch of filtration fabric, forming an aperture in said swatch of filtration fabric, disposing said projection of said first fuel line fitting on one side of said swatch of filtration fabric in alignment with said fabric aperture, disposing said aperture of said second fuel line fitting on the other side of said swatch of filtration fabric in alignment with said aperture in said swatch of filtration fabric and said projection of said first fuel line fitting, simultaneously applying ultrasonic energy and mechanical force to said first and said second fuel line fittings sufficient to dislodge material from said fittings and to drive said fittings together, engaging said filtration fabric generally about said aperture with said dislodged material and sealing the non-folded edges of said swatch of filtration fabric, whereby said filtration fabric is retained between said first and said second fuel line fittings by said dislodged material.

6. The method of claim 5 further including the step of providing said aperture in said second fuel line fitting with least two regions of distinct diameters defining a shoulder region and a first convoluted surface extending from said projection of said first fitting and a complementary opposed convoluted surface extending from said aperture of said second fuel line fitting.

7. The method of claim 5 further including the step of folding said swatch of fabric and positioning a porous insert within said folded swatch of fabric.

8. The method of claim 5 wherein said sealing of said non-folded edges is achieved by radio frequency or ultrasonic energy.

9. The method of claim 5 wherein said projection is provided with a frusto-conical surface and and said through aperture includes at least one shoulder.

10. The method of claim 5 wherein said first and said second fuel line fittings are provided with complementary convoluted surfaces and further including the step of compressing said fabric between said surfaces during assembly of said first and said second fittings.

11. A method of fabricating a fuel filter comprising the steps of:

providing a first fuel line fitting having a first through aperture and a frusto-conical projection region defining a first end of a first diameter and a second end of a second diameter larger than said first diameter, providing a second fuel line fitting having a second through aperture having a shoulder intermediate a first region of larger diameter and a second region of a diameter smaller than said first region, said first diameter of said first end of said frusto-conical projection region being slightly less than said diameter of said second region of said second fitting and said second diameter of said second end of said frusto-conical projection region being larger than said diameter of said second region of said second fitting, providing a swatch of filtration fabric, forming an aperture in said filtration fabric, disposing said first fuel line fitting on one side of said filtration fabric with said projection in alignment with said fabric aperture, disposing said second fuel line fitting on the other side of said filtration fabric with said second aperture in alignment with said fabric aperture and said first aperture, simultaneously providing ultrasonic energy and mechanical force to said first and said second fuel line fittings, to drive said fittings together and to dislodge material from said fittings into said filtration fabric, and sealing together the adjacent edges of said swatch of filtration fabric, whereby said filtration fabric is retained within said first and said second fuel line fittings by said dislodged material.

12. The method of claim 11 further including the step of folding said filtration fabric and sealing said folded fabric along three edges.

13. The method of claim 11 further including the step of providing a region adjacent said shoulder and said first region of said second fitting for receiving said dislodged material.

* * * * *